United States Patent [19]

Degaard

[11] Patent Number: 5,546,843
[45] Date of Patent: Aug. 20, 1996

[54] PIANO KEY IDENTIFICATION SYSTEM

[76] Inventor: John Degaard, 9 Woodland Dr., Hasbrouck Heights, N.J. 07604

[21] Appl. No.: 528,561

[22] Filed: Sep. 15, 1995

[51] Int. Cl.⁶ .................................................. G09B 15/08
[52] U.S. Cl. ............................................................ 84/478
[58] Field of Search ............................... 84/477 R, 478, 84/485 R; 434/365, 416

[56] References Cited

U.S. PATENT DOCUMENTS

| | | | |
|---|---|---|---|
| 877,911 | 2/1908 | Cross et al. .............................. | 84/478 |
| 3,430,530 | 3/1969 | Grindinger ................................ | 84/471 |
| 3,616,723 | 11/1971 | Gullickson .............................. | 84/478 |

*Primary Examiner*—Patrick J. Stanzione

[57] ABSTRACT

A system for labeling keys of a piano keyboard. The inventive device includes a plurality of informational stickers securable to individual keys of a keyboard. The stickers each include a staff and a clef, a particular note represented in both a musical notation on the staff and an English letter, and a solfege term printed on the sticker for identifying a particular key on a piano keyboard.

14 Claims, 3 Drawing Sheets

PIANO KEY IDENTIFICATION SYSTEM

BACKGROUND OF THE INVENTION

1. Field of the Invention

The present invention relates to musical instrument keyboards and more particularly pertains to a piano key identification system for labeling keys of a piano keyboard.

2. Description of the Prior Art

The use of musical instrument keyboards is known in the prior art. More specifically, musical instrument keyboards heretofore devised and utilized are known to consist basically of familiar, expected and obvious structural configurations, notwithstanding the myriad of designs encompassed by the crowded prior art which have been developed for the fulfillment of countless objectives and requirements.

While the prior art musical instrument keyboards fulfill their respective, particular objectives and requirements, the prior art does not disclose a piano key identification system for labeling keys of a piano keyboard which includes a plurality of informational stickers securable to individual keys of a keyboard, wherein the stickers each include a staff and a clef, a particular note represented in both a musical notation on the staff and an English letter, and a solfege term printed on the sticker for identifying a particular key on a piano keyboard.

In these respects, the piano key identification system according to the present invention substantially departs from the conventional concepts and designs of the prior art, and in so doing provides an apparatus primarily developed for the purpose of labeling keys of a piano keyboard.

SUMMARY OF THE INVENTION

In view of the foregoing disadvantages inherent in the known types of musical instrument keyboards now present in the prior art, the present invention provides a new piano key identification system construction wherein the same can be utilized for identifying keys on a piano keyboard. As such, the general purpose of the present invention, which will be described subsequently in greater detail, is to provide a new piano key identification system apparatus and method which has many of the advantages of the musical instrument keyboards mentioned heretofore and many novel features that result in a piano key identification system which is not anticipated, rendered obvious, suggested, or even implied by any of the prior art musical instrument keyboards, either alone or in any combination thereof.

To attain this, the present invention generally comprises a system for labeling keys of a piano keyboard. The inventive device includes a plurality of informational stickers securable to individual keys of a keyboard. The stickers each include a staff and a clef, a particular note represented in both a musical notation on the staff and an English letter, and a solfege term printed on the sticker for identifying a particular key on a piano keyboard.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new piano key identification system apparatus and method which has many of the advantages of the musical instrument keyboards mentioned heretofore and many novel features that result in a piano key identification system which is not anticipated, rendered obvious, suggested, or even implied by any of the prior art musical instrument keyboards, either alone or in any combination thereof.

It is another object of the present invention to provide a new piano key identification system which may be easily and efficiently manufactured and marketed.

It is a further object of the present invention to provide a new piano key identification system which is of a durable and reliable construction.

An even further object of the present invention is to provide a new piano key identification system which is susceptible of a low cost of manufacture with regard to both materials and labor, and which accordingly is then susceptible of low prices of sale to the consuming public, thereby making such piano key identification systems economically available to the buying public.

Still yet another object of the present invention is to provide a new piano key identification system which provides in the apparatuses and methods of the prior art some of the advantages thereof, while simultaneously overcoming some of the disadvantages normally associated therewith.

Still another object of the present invention is to provide a new piano key identification system for labeling keys of a piano keyboard.

Yet another object of the present invention is to provide a new piano key identification system which includes a plurality of informational stickers securable to individual keys of a keyboard, wherein the stickers each include a staff and a clef, a particular note represented in both a musical notation on the staff and an English letter, and a solfege term printed on the sticker for identifying a particular key on a piano keyboard.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF TEE PREFERRED EMBODIMENT

Figure 1:
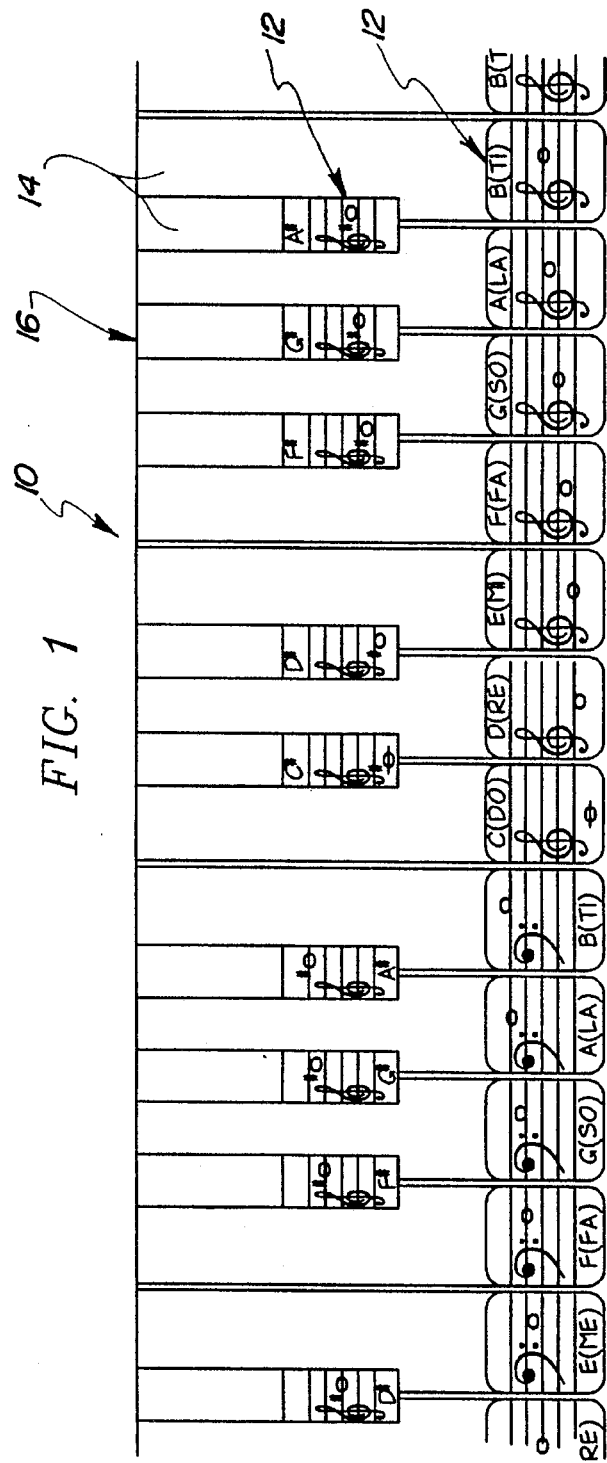
FIG. 1 is a top plan view of a piano key identification system according to the present invention in use.

With reference now to the drawings, and in particular to FIGS. 1–6 thereof, a new piano key identification system embodying the principles and concepts of the present invention and generally designated by the reference numeral 10 will be described.

More specifically, it will be noted that the piano key identification system 10 comprises a plurality of informational stickers 12 which can each be secured to an individual one of a plurality of keys 14 of a keyboard 16 of a conventionally known musical instrument such as a piano, synthesizer, or the like. The informational stickers 12 include indicia printed thereon communicating to an individual an identity of the particular key to which a particular informational sticker is attached. By this structure, an individual such as a student learning to play the associated musical instrument can readily identify the keys 14 of the keyboard 16 thereof as desired.

Figure 2:
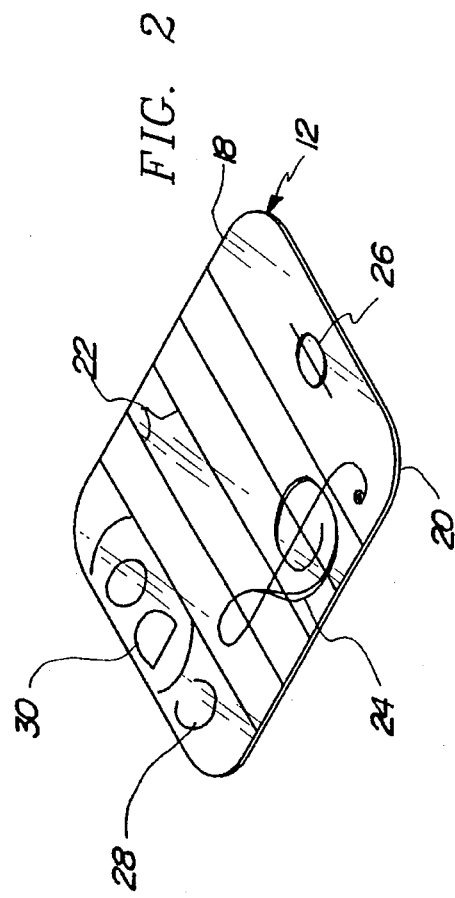
FIG. 2 is an isometric illustration of the invention, per se.
Figure 3:
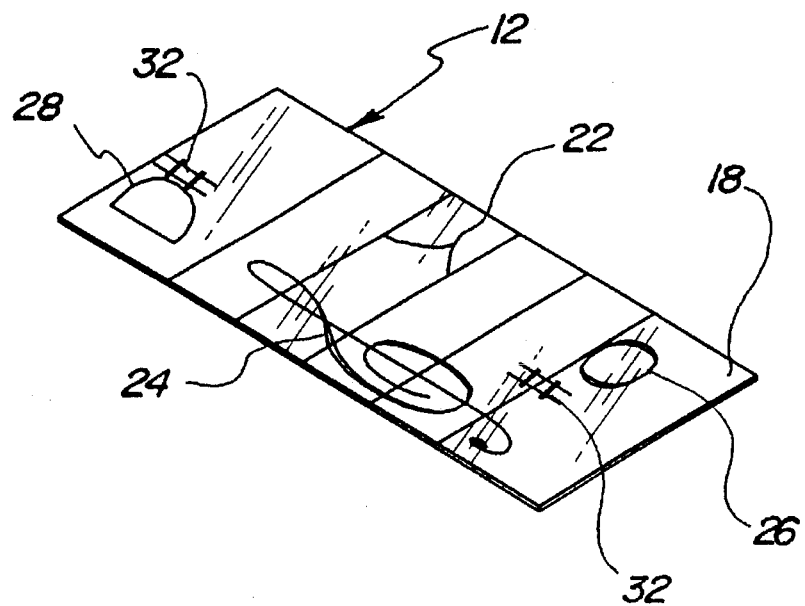
FIG. 3 is an isometric illustration of a further example of the present invention.
Figure 4:
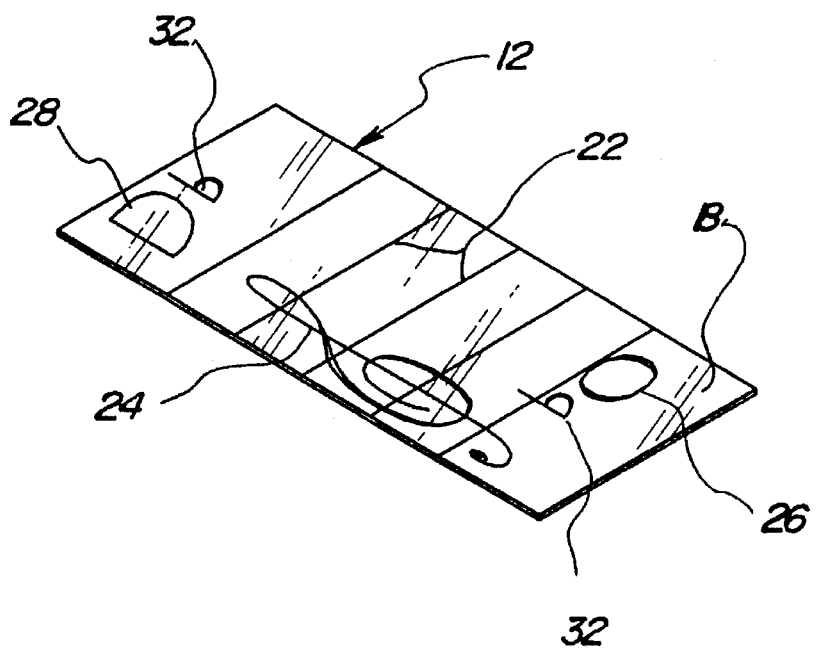
FIG. 4 is an isometric illustration of another example of the invention.

Referring now to FIGS. 2 through 4 wherein the present invention 10 is illustrated in detail, it can be shown that the informational stickers 12 each comprise a base web 18 formed in a substantially rectangular or square configuration and adapted to be positioned upon an upper surface a key 14 of the keyboard 16 as shown in FIG. 1 of the drawings. The base web 18 is preferably formed of a flexible paper or polymeric material which includes an adhesive 20 applied to a bottom surface thereof. The adhesive 20 is operable to effect securement of the base web 18 to an upper surface of a key 14 so as to secure the informational sticker 12 relative thereto. Preferably, the base web 18 and the adhesive 20 are substantially transparent such that a natural color of the respective key 14 can be seen therethrough.

With continuing reference to FIGS. 2 through 4, it can be shown that the indicia of each of the informational stickers 12 includes staff indicia 22 printed on an upper surface of the base web 18 which preferably comprises five spaced and parallel lines printed transversely across the base web. Clef indicia 24 is printed on the staff indicia 22 and oriented so as to reside on a left lateral side of a center line directed vertically through the informational sticker 12 as shown in FIG. 1 of the drawings. Further, musical note indicia 26 is printed relative to the staff indicia 22 for indicating a particular note of an associated key 14 of the keyboard 16 when the device is coupled thereto as shown in FIG. 1. In addition to the musical note indicia 26, English note indicia 28 is printed on the base web 18 and is preferably positioned either above or below the staff indicia 22, with both examples being shown in FIG. 1 of the drawings. To further assist a student in identifying a particular key 14 of the keyboard 16, solfege term indicia 30 can be printed on the base web 18 proximal to the English note indicia 28. By this structure, an individual such as a student learning the keyboard 16 of an associated musical instrument is permitted to readily identify each individual key 14 of the associated keyboard 16.

Referring specifically now to FIGS. 3 and 4 of the drawings, it can be shown that the informational stickers 12, in lieu of the solfege term indicia 30, may include whole-note indicia 32 printed on the base web 18 proximal to both the musical note indicia 26 and the English note indicia 28. As shown in FIG. 3, the whole-note indicia 32 may comprise a sharp-symbol (#), or alternatively may comprise a flat-symbol (b), as shown in FIG. 4 of the drawings. By this structure, sharp and flat keys 14 of the keyboard 16 can also be labeled for identification thereof by a student.

Figure 5:
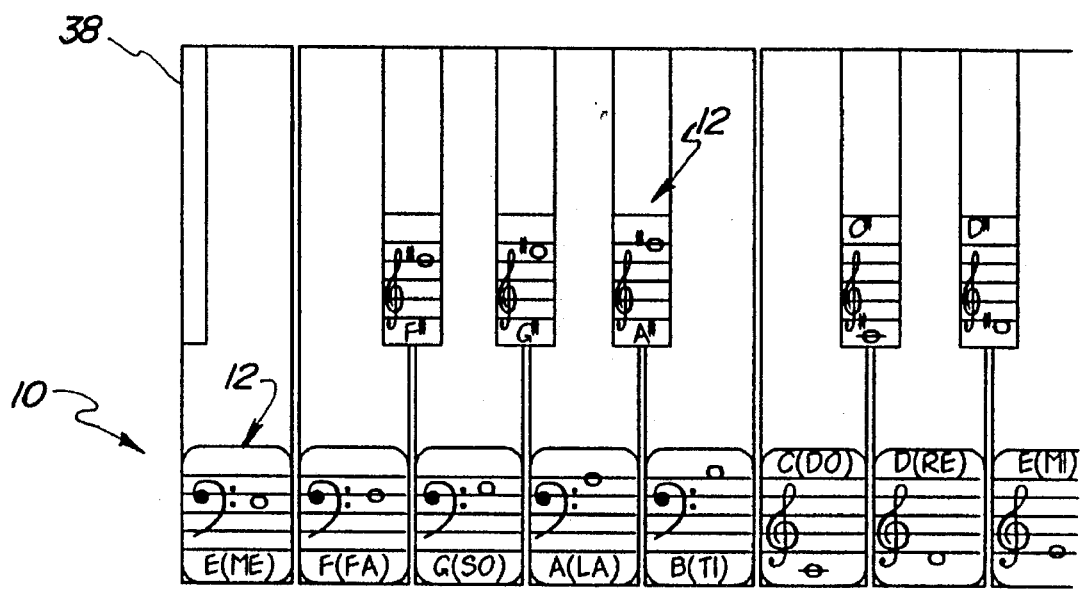
FIG. 5 is a top plan view of the piano key identification system including a removable template backing.
Figure 6:
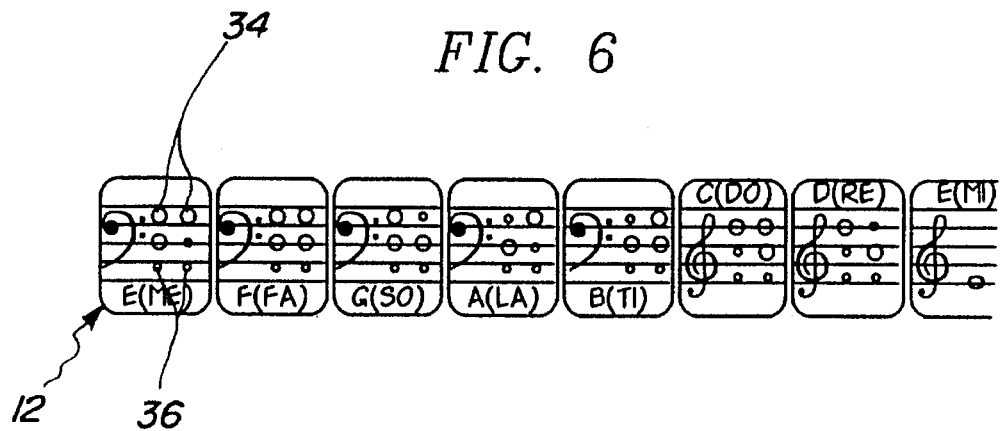
FIG. 6 is a top plan view of the piano key identification system including braille projections extending therefrom.

Turning now to FIGS. 5 and 6 of the drawings, it can be shown that the present invention 10 may further comprise braille indicia in the form of an aligned matrix of large braille projections 34 and small braille projections 36 which follow the well known braille coding system to permit identification of the respective keys of a piano in accordance therewith. As shown in FIG. 6, the piano key identification system may be initially provided with a removable template backing 38. The template backing 38 is configured so as to resemble a piano keyboard, with the informational stickers 12 being attached to the respective keys of the piano keyboard depicted on the template backing 38. By this structure, an individual can easily effect application of the informational stickers to the keys of a piano by simply matching the keys of the template backing 38 with the keys of the piano.

In use, the piano key identification system 10 of the present invention can be easily utilized for labeling keys of a piano keyboard 16 such as is shown in FIG. 1 of the drawings. The informational stickers 12 are preferably transparent so as to preserve a natural appearance of the keyboard 16. Further, the indicia printed on each sticker must be of a contrasting color relative to the respective keys 14 of the keyboard 16 when the base web 18 is constructed of a transparent material.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United State is as follows:

1. A piano key identification system comprising:

a plurality of informational stickers securable to an individual one of a plurality of keys of a musical instrument, the informational stickers each including indicia printed thereon communicating to an individual an identity of the particular key to which a particular informational sticker can be attached; said informational stickers each comprising a base web formed in a substantially rectangular configuration, said base web being formed of a flexible material having an adhesive applied to a bottom surface thereof and operable to effect securement of the base web to an upper surface of a key; and, a removable template backing configured so as to depict a piano keyboard, with the informational stickers each being attached to the respective keys of the piano keyboard depicted on the template backing.

2. The piano key identification system of claim 1, wherein the indicia of each of the informational stickers includes staff indicia printed on an upper surface of the base web, the staff indicia comprising five spaced and parallel lines printed transversely across the base web.

3. The piano key identification system of claim 2, wherein the indicia of each of the informational stickers further includes clef indicia printed on the staff indicia and oriented so as to reside on a left lateral side of a center line directed vertically through the informational sticker.

4. The piano key identification system of claim 3, wherein the indicia of each of the informational stickers further includes musical note indicia printed relative to the staff indicia for indicating a particular note of a key of a keyboard.

5. The piano key identification system of claim 4, wherein the indicia of each of the informational stickers further includes English note indicia printed on the base web.

6. The piano key identification system of claim 5, wherein the English note indicia is positioned above the staff indicia.

7. The piano key identification system of claim 6, wherein the indicia of each of the informational stickers further includes solfege term indicia printed on the base web.

8. The piano key identification system of claim 7, wherein the solfege term indicia is printed on the base web proximal to the English note indicia.

9. The piano key identification system of claim 6, wherein the indicia of each of the informational stickers further includes whole-note indicia printed on the base web.

10. The piano key identification system of claim 9, wherein the whole-note indicia is printed on the base web proximal to both the musical note indicia and the English note indicia.

11. The piano key identification system of claim 10, wherein the whole-note indicia comprises a sharp-symbol (#).

12. The piano key identification system of claim 11, wherein the whole-note indicia comprises a flat-symbol (b).

13. The piano key identification system of claim 12, wherein the base web and the adhesive are substantially transparent such that a natural color of a respective key can be seen therethrough.

14. The piano key identification system of claim 1, wherein the indicia comprises braille indicia in the form of an aligned matrix of large braille projections and small braille projections extending from the base web.

* * * * *